United States Patent [19]

Smith

[11] Patent Number: 5,126,450

[45] Date of Patent: Jun. 30, 1992

[54] UNSYMMETRICAL TRIPHENODIOXAZINE DYES

[75] Inventor: Peter Smith, Bury, England

[73] Assignee: Imperial Chemical Industries Plc, London, England

[21] Appl. No.: 607,707

[22] Filed: Nov. 1, 1990

[30] Foreign Application Priority Data

Nov. 16, 1989 [GB] United Kingdom ............. 8925899
Aug. 16, 1990 [GB] United Kingdom ............. 9018050

[51] Int. Cl.$^5$ .............. C07D 498/04; C09B 19/00; C09B 19/02
[52] U.S. Cl. ................................. 544/76; 544/77; 8/436; 8/527; 8/916; 8/917; 8/918
[58] Field of Search ........................... 544/76, 77

[56] References Cited

U.S. PATENT DOCUMENTS

| | | | |
|---|---|---|---|
| 3,996,221 | 12/1976 | Leng et al. | 544/76 |
| 4,568,742 | 2/1986 | Harms et al. | 544/77 |
| 4,591,643 | 5/1986 | Jäger | 544/76 |
| 4,786,107 | 10/1988 | Sawamoto et al. | 544/76 |
| 4,786,728 | 11/1988 | Schwaiger et al. | 544/77 |
| 4,841,049 | 6/1989 | Seitz | 544/77 |
| 5,019,134 | 5/1991 | Ridyard et al. | 544/77 |

FOREIGN PATENT DOCUMENTS

| | | |
|---|---|---|
| 0134033 | 3/1985 | European Pat. Off. |
| 0299328 | 1/1989 | European Pat. Off. |
| 0385120 | 5/1990 | European Pat. Off. |
| 1289867 | 11/1989 | Japan |
| 1368158 | 9/1974 | United Kingdom |

Primary Examiner—Mukund J. Shah
Assistant Examiner—Philip I. Datlow
Attorney, Agent, or Firm—Cushman, Darby & Cushman

[57] ABSTRACT

Unsymmetrical triphendioxazine (TPD) reactive dyes of Formula (1) for the colouration of e.g. wool, silk, leather and cotton are claimed as well as intermediates for their manufacture.

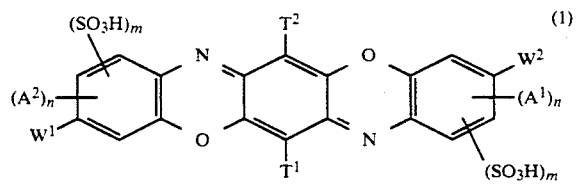

wherein
$W^1$ and $W^2$ are different and each independently of the formula:

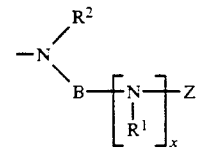

$R^1$ and $R^2$ in each group defined by $W^1$ or $W^2$ independently represent H or an optionally substituted hydrocarbon radical or are joined together to form, with B and the two N atoms, a piperazine ring;
each x independently has a value of 0 or 1;
each B independently represents an optionally substituted divalent hydrocarbon radical;
each Z independently represents a fibre-reactive group;
$T^1$ and $T^2$ each independently represents H, Cl, Br, F, $SO_3H$ or an optionally substituted alkyl or aryl radical;
$A^1$ and $A^2$ each independently represents an alkyl, alkoxy, Cl, Br, COOH, $SO_3H$ or optionally substituted sulphamoyl radical;
each n independently has a value of 0, 1 or 2; and
each m independently has a value of 1 or 2.

9 Claims, No Drawings

UNSYMMETRICAL TRIPHENODIOXAZINE DYES

This invention relates to reactive dyes and more particularly to reactive dyes of the triphenodioxazine series and their application to textile materials.

Reactive dyes of the triphenodioxazine series are known and have been described in, for example, United Kingdom Patent Specifications 1349513, 1368158, 1450746, 147707, 1559752 and 2059985 and in European Patent Specifications 212635, 260227 and 299328.

The present invention provides triphenodioxazine reactive dyes which, in the free acid form, have the Formula (1):

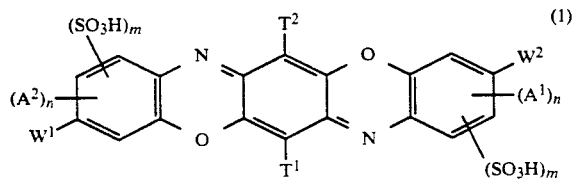

wherein $W^1$ and $W^2$ are different and each independently of the formula:

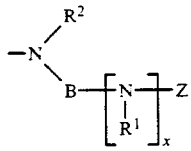

$R^1$ and $R^2$ in each group defined by $W^1$ or $W^2$ independently represents H or an optionally substituted hydrocarbon radical or are joined together to form, with B and the two N atoms, a piperazine ring;

each x independently has a value of 0 or 1;

each B independently represents an optionally substituted divalent hydrocarbon radical;

each Z independently represents a fibre-reactive group;

$T^1$ and $T^2$ each independently H, Cl, Br, F, SO$_3$H or an optionally substituted alkyl or aryl radical;

$A^1$ and $A^2$ each independently represents an alkyl, alkoxy, Cl, Br, COOH, SO$_3$H or optionally substituted sulphamoyl radical;

each n independently has a value of 0, 1 or 2; and each m independently has a value of 1 or 2.

In each group $W^1$ and $W^2$ when x has a value of 0 it is preferred that B is arylene and Z is a vinyl sulphonyl, beta-sulphato ethyl sulphonyl or beta-thiosulphatoethyl sulphonyl.

When any of the groups represented by $R^1$ and $R^2$ is an optionally substituted hydrocarbon radical it is preferably optionally substituted alkyl, especially $C_{1-4}$-alkyl which may be substituted but is preferably unsubstituted.

When either of $T^1$ and $T^2$ is optionally substituted alkyl it is preferably $C_{1-4}$-alkyl which may be substituted but is preferably unsubstituted. When any of $T^1$ and $T^2$ is optionally substituted aryl it is preferably phenyl or sulphophenyl.

It is preferred that each of $T^1$ or $T^2$ is $C_{1-4}$-alkyl, Br or more preferably Cl.

When any of $A^1$ or $A^2$ is alkyl or alkoxy it is preferably $C_{1-4}$-alkyl or $C_{1-4}$-alkoxy and it is preferred that $A^1$ and $A^2$ are identical.

It is preferred that n is 0 and that m is 1.

The fibre-reactive groups may be any of those known in the art, for example those described in GB-A-2063284. Such groups are capable, under suitable conditions, or reacting with the hydroxyl groups present in cellulosic fibres or with the amino groups present in natural and synthetic polyamide fibres to form a covalent linkage between the dye and the fibre.

Examples of fibre-reactive groups which may be represented by Z are aliphatic sulphonyl groups which contain a sulphate ester group in beta-position to the sulphur atom, e.g. beta-sulphato-ethylsulphonyl groups, alpha-beta- usaturated acyl radicals of aliphatic carboxylic acids, for example acrylic acid, alpha-chloro-acrylic acid, alpha-bromoacrylic acid, propiolic acid, maleic acid and mono- and dichloro maleic acids; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha,beta-dichloro- and dibromopropionic acids or radicals of vinylsulphonyl- or beta-chloroethylsulphonyl- or beta-sulphatoethyl-sulphonyl-endo-methylene cyclohexane carboxylic acids. Other examples of cellulose reactive groups are tetrafluoro-cyclobutyl-carbonyl, trifluoro-cyclobutenyl-carbonyl, tetrafluorocyclobutylethenyl-carbonyl, trifluorocyclobutenylethenyl-carbonyl; activated halogenated 1,3-dicyanobenzene radicals such as 2,4-dicyano-3,5-difluoro-6-chlorophenyl,
2,4-dicyano-3,5-difluoro-6-nitrophenyl,
2,4-dicyano-3,5,6-trifluorophenyl,
2,4-dicyano-3,5,6-trichlorophenyl,
2,4,6-tricyano-3,5-difluorophenyl,
2,4,6-tricyano-3,5-dichlorophenyl and heterocyclic radicals which contain 1, 2 or 3 nitrogen atoms in the heterocyclic ring and at least one cellulose reactive substituent on a carbon atom of the ring.

It may be noted that any reactive groups may be defined as both heterocyclic or acyl groups since they consist of an acyl group carrying a heterocyclic substituent. For convenience in such cases where the heterocyclic ring carries the cellulose reactive substituent these are usually referred to as heterocyclic reactive groups in this specification.

As examples of such heterocyclic radicals there may be mentioned for example:

2:3-dichloroquinoxaline-5- or -6-sulphonyl,
2:3-dichloroquinoxaline-5- or -6-carbonyl,
2:4-dichloroquinazolin-6- or -7-sulphonyl,
2:4:6-trichloroquinazolin-7- or -8-sulphonyl,
2:4:7- or 2:4:8-trichloroquinazolin-6-sulphonyl,
2:4-dichloroquinazolin-6-carbonyl,
1:4-dichlorophthalazine-6-carbonyl,
4:5-dichloropyridazon-1-yl-ethylcarbonyl,
2:4-dichloropyrimidine-5-carbonyl,
4-(4':5'-dichloropyridaz-6'-on-1'-yl)benzoyl,
2-chlorobenzthiazole-6-carbonyl,
3,6-dichloropyrazin-4-carbonyl,
4-(4':5'-dichloropyridaz-6'-on-1'-yl)phenylsulphonyl;
activated 4,6-dihalopyridin-2-yl and 2,6-dihalopyridin-4-yl groups such as:
3,4,5,6-tetrafluoropyridin-2-yl,
2,3,5,6-tetrafluoropyridin-4-yl,
2,4,6-trifluoro-3-cyanopyridin-4-yl, 2,5,6-trichloro-3-cyanopyridin-4-yl,
2,6-difluoro-3-cyano-5-chloropyridin-4-yl,
2,6-difluoro-3,5-dichloropyridin-4-yl;
and especially pyrimidinyl and triazinyl groups containing a cellulose reactive atom or group.

It is preferred that when the heterocyclic reactive group in $W^1$ or $W^2$ is a triazinyl or pyrimidinyl group, x in the same group $W^1$ or $W^2$ has a value of 1.

The preferred pyrimidinyl groups are pyrimidin-2-yl or -4-yl groups having a cellulose reactive atom or group, especially Cl, Br or F, in at least one of the remaining 2-, 4- and 6-positions. The 5-position may carry various substituents such as Cl or CN which are not normally cellulose reactive in themselves but may enhance the reactivity of substituents in other positions of the pyrimidine ring. As specific examples of such pyrimidinyl groups there may be mentioned:
2,6-dichloropyrimidin-4-yl,
4,6-dichloropyrimidin-2-yl,
2,5,6-trichloropyrimidin-4-yl,
4,5,6-trichloropyrimidin-2-yl,
5-chloro-2-methylsulphonyl-6-methylpyrimidin-4-yl,
2,6-dichloro-5-cyanopyrimidin-4-yl,
4,6-dichloro-5-cyanopyrimidin-2-yl,
2,6-difluoro-5-chloropyrimidin-4-yl,
4,6-difluoro-5-chloropyrimidin-2-yl,
2,6-difluoro-5-cyanopyrimidin-4-yl,
4,6-difluoro-5-cyanopyrimidin2-yl.

The preferred triazinyl groups are triazin-2-yl groups having cellulose reactive atoms or groups on one or both of the 4- and 6-positions. In this instance a wide range of cellulose reactive atoms or groups are available such as activated aryloxy or various groups linked through a sulphur atom, e.g. $SO_3H$. However, preferred reactive atoms or groups are halogens, such as F, Br and especially Cl and quaternary ammonium groups such as tri-lower alkyl ammonium, e.g. $(CH_3)_3N^+—$ and pyridinium groups especially those derived from pyridine carboxylic acids in particular from nicotinic acid or iso-nicotinic acid.

The triazinyl groups having only one reactive atom or group on the nucleus in the 4- or 6-position have a substituent not reactive to cellulose in the remaining 4- or 6-position.

Examples of such non-reactive substituents are alkyl- and aryl-thio groups, alkoxy and aryloxy groups and optionally substituted amino groups.

Examples of preferred non-reactive substituents are $C_{1-4}$-alkoxy, e.g. methoxy, ethoxy, n-propoxy and iso-propoxy, butoxy; lower alkoxy lower alkoxy, e.g. beta-methoxy-ethoxy, beta-ethoxyethoxy, phenoxy; sulphophenoxy; amino; $C_{1-4}$-alkylamino, e.g. methylamino, ethylamino, butylamino, di($C_{1-4}$-alkyl)amino, e.g. dimethylamino, diethylamino, methylethylamino, dibutylamino and groups of the latter two types in which the alkyl groups are substituted, in particular by OH, CN or $SO_3H$, e.g. beta-hydroxyethylamino, di(beta-hydroxyethyl)amino, beta-cyano- ethylamino, di(beta-cyanoethyl)amino, beta-sulphoethylamino, beta-hydroxypropylamino, (beta-hydroxybutyl)ethylamino and (beta-hydroxyethyl)methylamino; cycloalkylamino, e.g. cyclohexylamino; cyclo amino, e.g. morpholino or piperazino; naphthylamino substituted by 1,2 or 3 $SO_3H$ groups and optionally substituted phenyl amino groups.

Preferred optionally substituted phenylamino groups are of the formula:

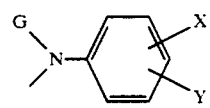

wherein G is H: $C_{1-4}$-alkyl, especially methyl or ethyl; substituted $C_{1-4}$-alkyl such as sulphomethyl and beta-carboxy-, beta-hydroxy- or beta-cyanoethyl; and Y and X are each independently selected from H, COOH, $SO_3H$, $CH_3$, $C_2H_5$, $OCH_3$, $OC_2H_5$, Cl, Br, CN, $NO_2$ and $NHCOCH_3$.

The optionally substituted divalent hydrocarbon radical represented by B is preferably alkylene, especially $C_{1-6}$-alkylene; aralkylene, preferably $C_{7-11}$-aralkylene, especially phenyl $C_{1-4}$-alkylene; and arylene, preferably arylene with up to six carbon atoms, especially phenylene; which may be substituted or unsubstituted.

As examples, of alkylene and aralkylene radicals represented by B, there may be mentioned:
ethylene
1,2- and 1,3-propylene
2-hydroxy-1,3-propylene
1- and 2-phenyl-1,3-propylene
2-(4'-sulphopheynl)-1,3-propylene
1,4-, 2,3- and 2,4-butylene
2-methyl-1,3-propylene
2-methyl-2,4-pentylene
2,2-dimethyl-1,3-propylene
1-phenylethylene
1-chloro-2,3-propylene
1,6- and 2,5-hexylene
2,3-diphenyl-1,4-butylene
1-(methoxycarbonyl)-1,5-pentylene
1-carboxy-1,5-pentylene
2,7-heptylene
3-methyl-1,6-hexylene
—$CH_2CH_2OCH_2CH_2$—
—$CH_2CH_2SCH_2CH_2$—
—$CH_2CH_2SSCH_2CH_2$—

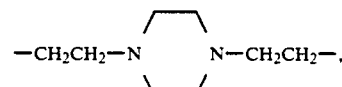

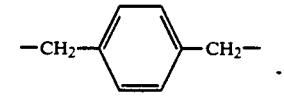

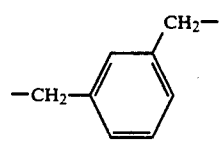

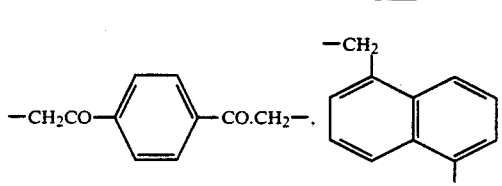

As examples of arylene radicals represented by B there may be mentioned 1,2-, 1,3- and 1,4-naphthylene which are optionally sulphonated.

It is preferred that in $W^1$ and $W^2$ respectively, one group defined by B is 1,4 1,3 or 1,2 optionally substituted phenylene, and the other group defined by B is alkylene.

When any of $R^1$, $R^2$ and B is substituted the substituent is preferably selected from halo, especially chloro; hydroxy; —$CO_2H$; —$SO_3H$; —$NH_2$; —CN; $C_{1-4}$-alkoxy, especially methoxy; $C_{1-4}$-alkyl, especially methyl; and acetamido.

It is preferred that the fibre-reactive groups represented by Z are selected from vinylsulphonyl groups or precursor groups thereof and, especially, triazin-2-yl groups, for example monochlorotriazinyl, monofluorotriazinyl or dichlorotriazinyl groups, and quaternary ammonium derivatives thereof.

As examples of particularly useful dyes within the scope of Formula (1), there may be mentioned dyes of Formulae (2), (3) or (4):

$R^2$ in Formula (1), and are preferably H or a $C_{1-4}$-alkyl radical; and p has a value of 0, 1 or 2.

Formula (4)

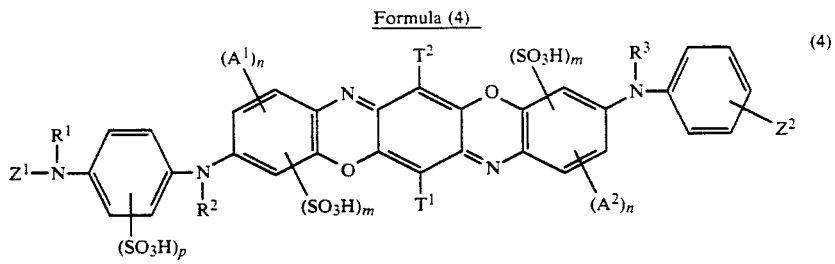

wherein $Z^1$ is a fibre-reactive group such as heterocyclic reactive group as hereinbefore defined, or preferably a triazinyl, especially a halotriazinyl reactive group; and $Z^2$ is a vinyl sulphonyl group or a precursor thereof, for example sulphatoethylsulphonyl or thiosulphatoethylsulphonyl. In Formula (4) $Z^2$ is preferably para with respect to the group $N(R^3)$; p has a value of 0, 1 or 2; and $R^3$ is H or an optionally substituted hydrocarbon radical, preferably H or a $C_{1-4}$-alkyl radical.

In the dyes of Formulae (2) and (3) and (4), $T^1$, $T^2$, $A^1$, $A^2$, in and m have the meanings given in relation to Formula (1) and $R^1$ and $R^2$ are each independently H or an optionally substituted hydrocarbon radical.

The dyes of the invention may be prepared by reactions conventional in the preparation of cellulose reactive dyes and triphenodioxazines. Thus, for example, dyes of the invention may be prepared by reacting an acylating agent capable of introducing a fibre-reactive group with a precursor of the unsymmetrical tri- Formula (2)

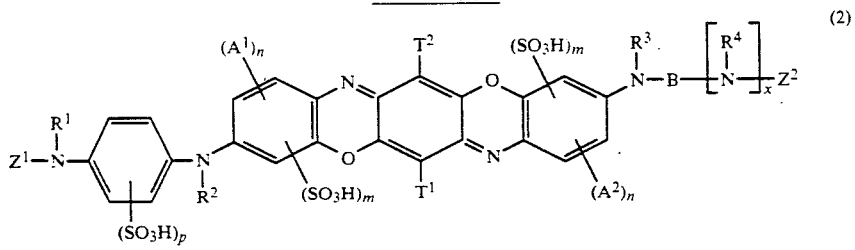

wherein $Z^1$ and $Z^2$ are each independently fibre-reactive groups; $R^3$ and $R^4$ have the meanings given for $R^1$ and $R^2$ in Formula (1); and p has a value of 0, 1 or 2. In Formula (2) it is preferred that when B is an arylene radical x is 0.

phenodioxazine compound of the Formula (1) in which at least one Z is H.

The compounds of Formula (1) wherein at least one Z is H form a further aspect of the present invention since these are valuable new dye intermediates.

Formula (3)

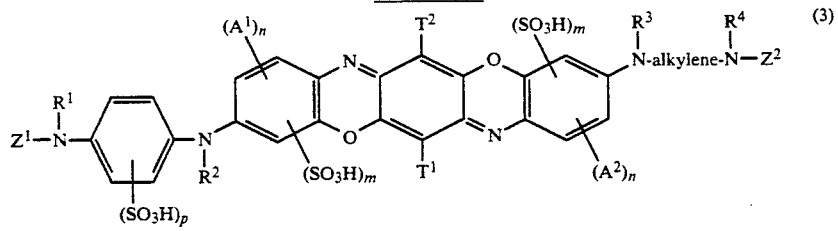

wherein the alkylene radical of Formula (3) is preferably $C_{1-4}$-alkylene, e.g. ethylene; $Z^1$ and $Z^2$ are each as defined under Formula (2) above, and are preferably halogenotriazinyl or a quaternary ammonium salt thereof; $R^3$ and $R^4$ have the meanings given for $R^1$ and Suitable acylating agents particularly include cyanuric chloride and its primary condensation products with ammonia, primary or secondary amines, alcohols or mercaptans.

Precursors of compounds of Formula (1) in which at least one Z is H may be obtained by methods analogous to those described in art, for example by ring closure of the corresponding unsymmetrical dianilides using strongly acid condensing agents, for example oleum with a persulphate. Sulphonic acid groups may be introduced into the dianilide during cyclisation, for example into any aryl groups which may be present. Cyclisation conditions may also convert beta-hydroxyethyl sulphonyl groups, when present, to beta-sulphatoethylsulphonyl groups.

Thus the compounds of Formula (1), (2) or (3) may be prepared by ring closure of the unsymmetrical dianilinide of Formula (5) using oleum and a persulphate:

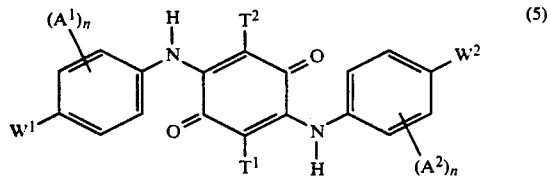
(5)

wherein $T^1$, $T^2$, $A^1$, $A^2$, n, $W^1$ and $W^2$ have the meanings given above except that in $W^1$ and $W^2$, each Z is H.

The unsymmetrical dianilinides may be made in a stepwise manner by the general methods described in the art, for example in United Kingdom Patent Specifications 509891 and 509893 and European Patent Specification 0356014 A1 Examples 22 to 39.

For example, the unsymmetrical dianilinides of Formula (5) may be prepared by condensation of monoanilinide of Formula (6), with a compound of Formula (7), wherein $T^1$, $T^2$, $A^1$, $A^2$, n, $W^1$ and $W^2$ have the meanings given above, except that, in $W^1$ and $W^2$ each Z is H. It is preferred that the condensation is carried out in a solvent, such as water or methanol, at a pH of approximately 6 (e.g. pH 5.5 to 6.5), and at elevated temperatures of around 50° C. (e.g. 40°-60° C.) for a period of several hours (e.g. ½ to 24 hours).

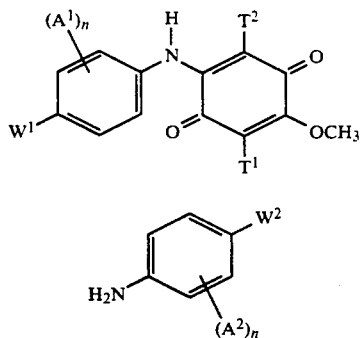

The monoanilinides of Formula (6) may themselves be prepared by the general process described in European Patent Specification 0356014 A1, particularly page 10 line 25 to page 12 line 20, wherein a para-substituted aniline derivative is condensed with 2-methoxy-3,5,6-trichlorobenzoquinone ("MTBQ"). It is preferred that the condensation takes place in a solvent, e.g. methanol or water, a temperature of 18° C. to 50° C. is normally employed, and a pH of approximately 5-6 over a period of for example ½ to 24 hours is normally sufficient.

The dyes of Formula (4) may be prepared by reacting a compound of Formula (7), wherein $W^2$ is an optionally substituted phenylamino group having e.g. a beta-hydroxyethyl sulphonyl substituent, with a compound of Formula (6) as defined above, to give a dianilinide of Formula (5) wherein $T^1$, $T^2$, $A^1$, $A^2$, n and $w^1$ are as defined in Formula (1) and $W^2$ is an optionally substituted phenylamino group having e.g. a beta-hydroxyethyl sulphonyl substituent. Ring closure of the dianilinide so prepared, using conditions described above, may yield a compound of Formula (4) wherein $Z^2$ is beta-sulphatoethyl sulphonyl and $Z^1$ is H. Such a compound is useful as a dye in its own right, but may be converted into a bifunctional reactive dye by acylation of the amino group defined by $Z^1$—N($R^1$)— using a heterocyclic reactive group as hereinbefore defined, particularly a di- or tri-chlorotriazinyl heterocyclic reactive group.

The dyes prepared as described above may be isolated by any conventional means, for example by spray drying or precipitation and filtration.

The dyes contain sulphonic acid groups which confer water-solubility and they may be isolated with such groups in the free acid form. However, it is usually found more convenient to isolate the dyes in the form of salts particularly alkali metal salts, especially sodium or mixed sodium/lithium salt.

The dyes of the present invention may be used for coloring a wide range of textile materials containing hydroxyl or amino groups, for example wool, silk, leather, synthetic polyamides and natural or regenerated cellulose, for example cotton or viscous rayon materials, by conventional dyeing, padding or printing methods used for coloring such materials with water-soluble reactive dyes. In the case of cellulose, they are preferably applied in conjunction with a treatment with an acid binding agent, for example caustic soda, sodium carbonate, phosphate, silicate or bicarbonate, which may be applied to the cellulose textile materials before, during or after the application of the dye.

The dyes of the present invention are valuable reactive dyes for cellulose. They generally yield bright blue colored textiles with good resistance to washing, chlorine and light. They are usually characterised by good strength and an ability to build-up to high depths of shade, the shades being somewhat redder than those of the corresponding symmetrical triphenodioxazine reactive dyes.

The present invention also provides liquid dye formulations comprising at least five parts, and preferably at least 10 parts of a reactive dye of Formula (1) dissolved in 100 parts of water. It is preferred that such liquid dye formulations contain total inorganic salts in a percentage of less than 30%, more preferably less than 10%, especially 0-5%, wherein the % figure is expressed as grams of inorganic salt/volume of liquid. The term "inorganic salts" means any of the salts resulting from the dye manufacturing processes and commonly found in liquid dye formulations, for example NaCl, KCl, $Na_2SO_4$ etc.

Inorganic salts can be substantially removed from the liquid dye formulations using conventional means, for example by a membrane separation process such as reverse osmosis.

The invention is illustrated but not limited by the following Examples in which all parts and percentages are by weight unless otherwise indicated.

MONOANILINIDES

EXAMPLE 1

4.6 Parts of 5-amino-2-(2-aminoethylamino)benzenesulphonic acid in 20 parts of water at pH 5 was mixed with 4.8 parts of 2-methoxy-3,5,6-trichlorobenzoquinone in 100 parts of methanol at pH 5.6 and 40° C. The mixture was stirred at 40° C. for 1 hour whilst maintaining the pH at pH 5. The mixture was cooled in ice, filtered and the solid washed with methanol and dried. 6.9 parts of compound of Formula (8), 2-(4-(2-aminoethylamino-3-sulphoanilino)-3,6-dichloro-5-methoxy-1,4-benzoquinone were obtained.

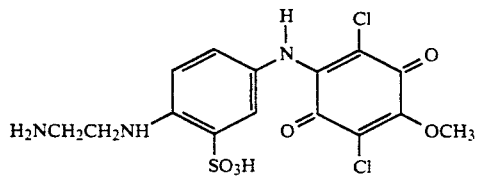

(8)

EXAMPLE 2

15 parts of 5-amino-2-(2-aminoethylamino)-benzenesulphonic acid was mixed with 14 parts of 2-methoxy-3,5,6-trichlorobenzoquinone in 750 parts of methanol at pH 5.6 and room temperature. The mixture was stirred at room temperature for 16 hours whilst maintaining the pH at pH 5.4. The mixture was filtered and the solid washed with methanol, water and dried. 15.5 parts of compound of Formula (8) were obtained.

EXAMPLE 3

19 parts of 4,4'-diaminodiphenylamine-2,3'-disulphonic acid was mixed with 14 parts of 2-methoxy-3,5,6-trichlorobenzoquinone in 750 parts of methanol at pH 5.0 and room temperature. The mixture was stirred at room temperature for 16 hours whilst maintaining the pH at pH 5.4. The mixture was filtered and the filtrates were evaporated to dryness. 24.8 parts of the compound of Formula (9) were obtained.

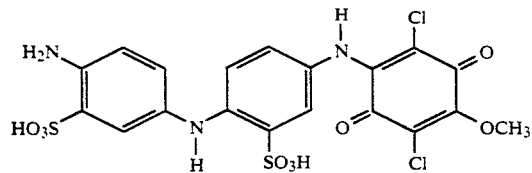

(9)

EXAMPLES 4 to 6

Further monoanilinides may be prepared using the method of Example 2 except that in place of 5-amino-2-(2-aminoethylamino)-benzene sulphonic acid there is used the amine shown in the second column of the table below.

| Ex. | Amine |
|---|---|
| 4 | 5-amino-2-(2-hydroxy-1,3-diaminopropylene)benzene sulphonic acid |
| 5 | 3-sulpho-4-(4-(vinylsulphonyl)phenylamino)aniline |
| 6 | N-(sulpho-4-aminobenzyl)ethylene diamine |

Dianilinides
EXAMPLE 7

Preparation of the compound of Formula (10) wherein $W^3$ is $H_2NCH_2CH_2NH—$ and $W^4$ is 3-sulpho-4-(4-amino-3-sulphophenylamino)-anilinyl

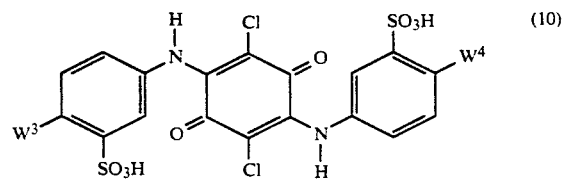

(10)

A solution of 3-sulpho-4-(4-amino-3-sulphophenylamino)aniline (4.0 g) in water (40 ml) at pH 6 was added to a slurry of a slurry of the monoanilinide from Example 1 (4.4 g) in methanol (120 ml) at pH 6.5. The mixture was stirred at 45°-50° C., pH 6-6.5 for 5½ hours, cooled in ice and the resultant solid filtered off, washed with methanol (30) and dried to give 6.0 g of the title dianilinide.

EXAMPLES 8 to 11

The procedure of Example 7 may be followed except that in place of 3-sulpho-4-(4-amino-3-sulphophenylamino)aniline there is used an equivalent amount of the amine shown in the second column, and in place of the monoanilinide from Example 1 there is used an equivalent amount of the monoanilinide from the Example shown in the third column to give a dianilinide of Formula (10) wherein $W^3$ and $W^4$ are respectively as defined in the fourth and fifth columns below.

| Ex | Amine | Monoanilide from Example | $W^3$ | $W^4$ |
|---|---|---|---|---|
| 8 | 5-amino-2-(aminoethylamino) benzene sulphonic acid | 5 | 4-(vinylsulphonyl) phenylamino | —NHCH$_2$CH$_2$NH$_2$ |
| 9 | N-(3-sulpho-4-aminobenzyl) ethylene diamine | 3 | 3-sulpho-4-amino-phenyl-amino | —NHCH$_2$CH$_2$NH$_2$ |
| 10 | 5-amino-2-(1,3-diaminopropyl) benzene sulphonic acid | 4 | —NHCH$_2$CH(OH)CH$_2$NH$_2$ | —NHCH$_2$CH$_2$CH$_2$NH$_2$ |
| 11 | 4,4'-diamino-diphenylamine-2,3'-disulphonic acid | 5 | 4-(vinylsulphonyl) phenylamino | 3-sulpho-4-amino-phenyl-amino |

TPD derivatives

EXAMPLE 12

Preparation of the compound of Formula (11) wherein $W^3$ is $H_2NCH_2CH_2NH-$ and $W^4$ is 4-amino-3-sulphophenylamino

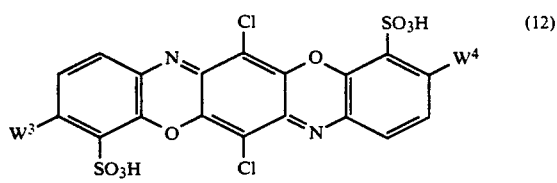

To a stirred solution of the dianilinide from Example 7 (2 g) in concentrated $H_2SO_4$ (20 ml) at 20° C. was added $MnO_2$ (0.6 g). The temperature rose to 42° C. The mixture was stirred without heating for $2\frac{1}{4}$ hours, drowned into ice/water and the solid filtered off, washed with 20% brine and dried to give 3.2 g of the title product.

Examples 13 to 16

The procedure of Example 12 may be followed except that in place of the dianilinide from Example 7 there is used the dianilinide from the Example shown in the second column below to give the TPD derivative of Formula (11) wherein $W^3$ and $W^4$ are respectively as defined in the third and fourth columns below.

| Example | Dianilinide from Example | $W^3$ | $W^4$ |
|---------|--------------------------|-------|-------|
| 13 | 8 | 4-(vinylsulphonyl)-phenylamino | $-NHCH_2CH_2NH_2$ |
| 14 | 9 | 3-sulpho-4-amino-phenylamino | $-NHCH_2CH_2NH_2$ |
| 15 | 10 | $-NHCH_2CH(OH)CH_2NH_2$ | $-NHCH_2CH_2CH_2NH_2$ |
| 16 | 11 | 4-(vinylsulphonyl)-phenylamino | 3-sulpho-4-amino-phenylamino |

EXAMPLE 17

Preparation of the compound of Formula (12) wherein $B^2$ is 1,2-ethylene, $B^1$ is sulpho-1,4-phenylene, $Z^2$ and $Z^1$ are each 3,5-dichlorotriazinyl

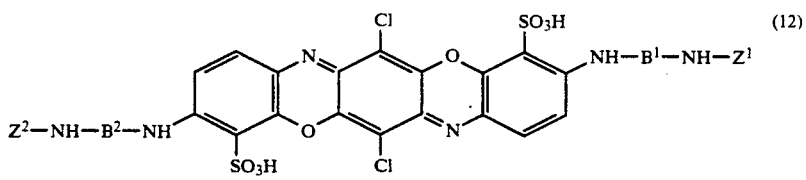

To the compound formed in Example 12 (3 g) in water (150 ml) at pH 9-10 (pH adjusted using 2N NaOH), 0°-10° C., was added Calsolene oil (1 drop) and cyanuric chloride (1 g), and the mixture stirred at pH 8-9 for approximately 17 hours whilst maintaining the temperature between 0° and 10° C.

The product was filtered to remove insoluble matter and the filtrate salted to 30% w/v with NaCl, stirred for 3 hours, then the precipitate filtered off. The filter cake was washed with a little 30% w/v NaCl solution, mixed with 0.7 g of mixed phosphate buffer and made into a buffered paste (at about pH 6.5-7) and dried in vacuo over $CaCl_2$ to give the title product.

EXAMPLES 18 to 20

Further dyes may be obtained if a similar procedure to that of Example 17 is followed except that in place of the compound of Example 12 there is used an equivalent amount of the compound from the Example shown in the second column, and in place of cyanuric chloride there is used an equivalent amount of the acylating agent shown in the third column.

| Example | Compound from Example | Acylating agent |
|---------|----------------------|-----------------|
| 18 | 14 | 2,4-dichloro-6-(dimethylamino)-s-triazine |
| 19 | 15 | 2,4-diflouro-6-(2',5'-disulphonanilino)-s-triazine |
| 20 | 12 | 2,4-dichloro-6-(2-sulphatoethylamino)-s-triazine |
| 21 | 15 | 2,4,6-trichloro-5-cyanopyrimidine |

EXAMPLE 22

Preparation of the compound of Formula (4) wherein $R^1$, $R^2$ and $R^3$ are H, n is 0, m is 1, $T^1=T^2=Cl$, p=1, $Z^1$ is dichlorotriazinyl and $Z^2$ is 4-(vinylsulphonyl)

The title bifunctional reactive dye may be prepared by following the procedure of Example 17 except that in place of the compound of Example 12 there is used the compound of Example 13.

I claim:

1. Reactive dyes which, in the free acid form, have the Formula (1):

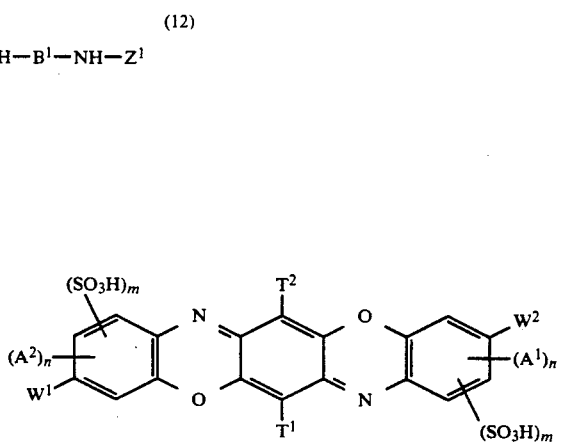

wherein
$W^1$ and $W^2$ are different from each other, and each is of the formula:

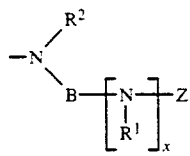

$R^1$ and $R^2$ in each group defined by $W^1$ or $W^2$ independently represents H or an optionally substituted alkyl radical or are joined together to form, with B and the two N atoms, a piperazine ring;

each x independently has a value of 0 or 1;

each B independently represents an optionally substituted alkylene, phenylalkylene, naphthylalkylene, phenylene or naphthylene radical;

each Z independently represents a fiber-reactive group;

$T^1$ and $T^2$ each independently represents H, Cl, Br, F, $SO_3H$ or an optionally substituted alkyl or aryl radical;

$A^1$ and $A^2$ each independently represents alkyl, alkoxy, Cl, Br, COOH, $SO_3H$ or optionally substituted sulphamoyl;

each n independently has a value of 0, 1 or 2; and each m independently has a value of 1 or 2.

2. Reactive dyes which, in the free acid form, have the Formula (2):

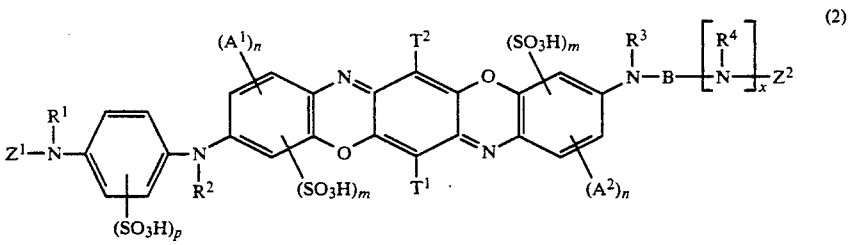

wherein $A^1$, n, m, $T^1$, $T^2$, $A^2$, B and x are as defined in claim 1;

$Z^1$ and $Z^2$ are fiber-reactive groups which are the same as or different to each other;

p has a value of 0, 1 or 2;

$R^1$ and $R^2$ are each independently H or an optionally substituted hydrocarbon radical;

$R^3$ and $R^4$ have the meanings given to $R^1$ and $R^2$ in claim 1;

with the proviso that x has a value of zero when B is phenylene or napthlene radical.

3. Reactive dyes of the Formula (3):

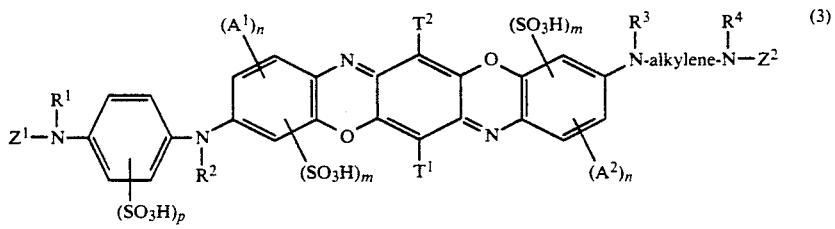

wherein $Z^1$, $Z^2$, $A^1$, $A^2$, n, m, p, $T^1$, $T^2$, $R^1$, $R^2$, $R^3$ and $R^4$ are as defined in claim 2.

4. Reactive dyes of the Formula (4):

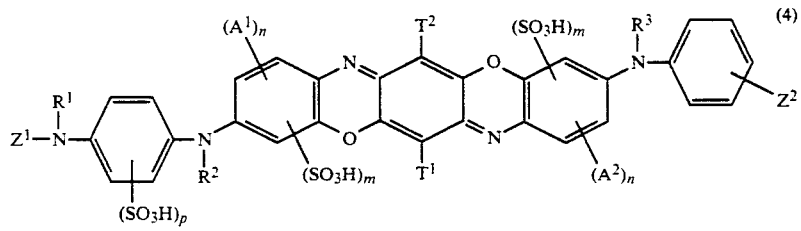

wherein $Z^1$ is a fiber-reactive group;

$Z^2$ is a vinyl sulphone group or a precursor thereof;

$A^1$, $A^2$, n, m, p, $T^1$, $T^2$, $R^1$ and $R^2$ have the meanings given in claim 2; and $R^3$ is H or an optionally substituted hydrocarbon radical.

5. Reactive dyes according to claim 1 to 4 in which $T^1$ and $T^2$ are each independently selected from $C_{1-4}$-alkyl, Br and Cl.

6. Reactive dyes according to claim 1 in which $T^1$ and $T^2$ are Cl.

7. Reactive dyes according to claim 1 in which $A^1$ and $A^2$ are $C_{1-4}$-alkyl or $C_{1-4}$-alkoxy.

8. Reactive dyes according to claim 1 wherein each n has a value of 0 and each m has a value of 1.

9. A liquid dye formulation comprising at least 15 parts of a reactive dye according to claim 1 dissolved in 100 parts of water and containing less than 30% inorganic salts.

* * * * *